United States Patent [19]

Goodman et al.

[11] 4,120,567
[45] Oct. 17, 1978

[54] ELECTRO-OPTIC DEVICE

[75] Inventors: Lawrence Alan Goodman, East Windsor; Aaron William Levine, Lawrenceville; Dietrich Meyerhofer, Princeton, all of N.J.

[73] Assignee: RCA Corporation, New York, N.Y.

[21] Appl. No.: 767,957

[22] Filed: Feb. 11, 1977

[51] Int. Cl.² .......................... C09K 3/34; G02F 1/13
[52] U.S. Cl. ................................. 350/350; 252/299; 252/408
[58] Field of Search ........................... 252/299, 408; 350/160 LC, 350

[56] References Cited

U.S. PATENT DOCUMENTS

| | | | |
|---|---|---|---|
| 3,836,478 | 9/1974 | Green et al. | 252/408 |
| 3,947,375 | 3/1976 | Gray et al. | 252/299 |
| 3,974,087 | 8/1976 | Gray et al. | 252/299 |
| 4,009,934 | 3/1977 | Goodwin et al. | 350/160 LC |
| 4,011,173 | 3/1977 | Steinstrasser | 252/299 |
| 4,017,416 | 4/1977 | Inukai et al. | 252/299 |
| 4,020,002 | 4/1977 | Oh | 252/299 |

FOREIGN PATENT DOCUMENTS

| | | | |
|---|---|---|---|
| 2,456,083 | 6/1975 | Fed. Rep. of Germany | 252/299 |
| 2,502,904 | 7/1975 | Fed. Rep. of Germany | 252/299 |
| 2,538,865 | 3/1976 | Fed. Rep. of Germany | 252/299 |
| 5,023,385 | 3/1975 | Japan | 252/299 |

*Primary Examiner*—Richard E. Schafer
*Assistant Examiner*—T. S. Gron
*Attorney, Agent, or Firm*—H. Christoffersen; Birgit E. Morris

[57] ABSTRACT

Liquid crystal mixtures of liquid crystalline esters, biphenyls and terphenyls have wide useful temperature ranges, fast response times and a small index of refraction anisotropy which can be employed in liquid crystal cells having improved viewing angles.

2 Claims, 2 Drawing Figures

ELECTRO-OPTIC DEVICE

This invention relates to liquid crystal electro-optic devices. More particularly, this invention relates to liquid crystal cells having improved wide angle viewing.

BACKGROUND OF THE INVENTION

Twisted nematic liquid crystal cells have recently found widespread commercial acceptance for applications such as electronic watch faces because of their excellent contrast, low voltage requirements and fast response times. These cells comprise two glass plates having a transparent, conductive, patterned film thereon to act as electrodes, usually rubbed or slant evaporated with a thin film of a dielectric to align the liquid crystal in a direction parallel to the plane of the plates. The plates are assembled so that the liquid crystal molecules at each surface are at right angles to each other. The molecules in the intervening space are aligned intermediate thereto, and thus the layers have a twist throughout the cell. When a voltage is applied to the cell, the layers untwist, affecting the passage of light through the cell which is visible through external polarizers.

The liquid crystal materials useful in twisted nematic liquid crystal cells must be stable, have low voltage requirements, fast response times, broad useful temperature ranges and good contrast. One long standing problem in this art is that the range of angles over which good contrast is visible to the viewer is somewhat limited, generally on the order of about 50°-60°. It would be desirable, particularly for larger displays, to maximize the range of angles over which the liquid crystal display is visible.

One known method of increasing the viewing angle is by increasing the ratio of the voltage applied to the cell to the threshold voltage, that is, the minimum voltage needed to realign the liquid crystal molecules in the cell. However, generally this is impractical, particularly in watches, where only small batteries with a fixed voltage output are employed at the source of current. Thus it would be desirable to increase the viewing angle of the liquid crystal cells without increasing the voltage requirements.

It is also known that larger angles of viewability in liquid crystals are found in compositions that have a small index of refraction anisotropy, see Gharadjedaghi and Robert, Revue de Physique Applique, Vol. 11, July 1976. Index of refraction anisotropy is the difference between the index of refraction measured along the principal axis and the index of refraction measured perpendicular to the principal axis. The viewing angle is inversely proportional to the square root of the index of refraction anisotropy.

However, most liquid crystal mixtures in general use either have high index of refraction anisotropies, or are otherwise inadequate because their useful temperature ranges are too high or too small, or their response times are too long.

SUMMARY OF THE INVENTION

We have found that certain liquid crystal mixtures of liquid crystalline esters, biphenyl compounds and terphenyl compounds have broad mesomorphic temperature ranges, fast response times, and small indices of refraction anisotropy. These mixtures are eminently suitable for use in twisted nematic liquid crystal electro-optic devices.

DETAILED DESCRIPTION OF THE INVENTION

Liquid crystal esters in general have comparatively low index of refraction anisotropies, but unfortunately they also have high useful temperature ranges (above room temperature) and slow response times. Thus, they must be admixed with other liquid crystals to form compositions satisfactory for commercial applications.

Mixtures of biphenyl liquid crystals, terphenyl liquid crystals and liquid crystal esters have proven to be satisfactory for use in liquid crystal cells that have low voltage requirements, fast response times, good contrast and wide viewing angles.

Exemplary of the esters useful herein are those having the formula

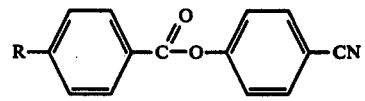

wherein R is an alkyl group of 4 to 10 carbon atoms and,

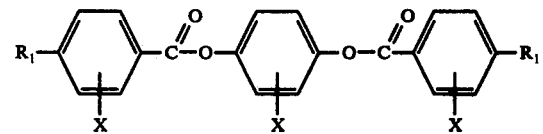

wherein $R_1$ at each occurrence is an alkyl group of 1-10 carbon atoms and X at each occurrence is hydrogen or group with the proviso that at least one X is methyl The biphenyl compounds useful herein have the formula

wherein $R_2$ is alkyl or alkoxy of 3 to 8 carbon atoms.

The terphenyl compounds useful herein have the formula

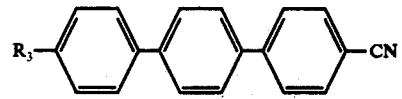

wherein $R_3$ is an alkyl or alkoxy group of 4 to 6 carbon atoms.

Useful mixtures of these compounds have an index of refraction anisotropy on the order of from about 0.17 to 0.23.

The above mixtures have a viewing angle in a liquid crystal cell that is about 20° wider than that of liquid crystal materials having a high index of refraction anisotropy of about 0.28.

Figure 1:
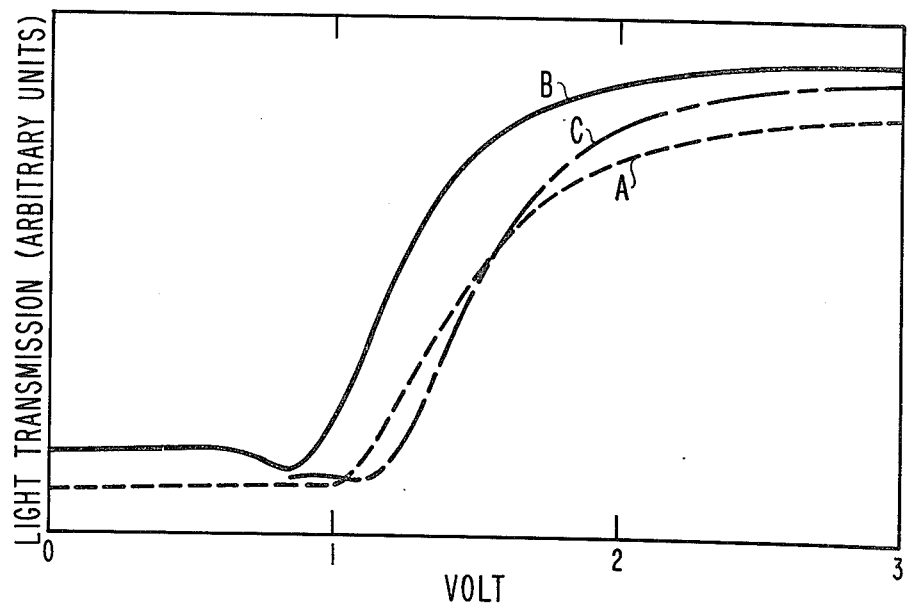
FIG. 1 is a graph showing the transmission of light versus applied voltage for several liquid crystal compositions of varying index of refraction anisotropy.

The light transmission versus voltage for several liquid crystal compositions in a liquid crystal cell are shown in FIG. 1. The steeper the slope of the light transmission line above the threshold voltage, which varies among the liquid crystals shown, the wider the viewing angle of the mixture. In FIG. 1, curve A represents a liquid crystal having an index of refraction anisotropy of 0.28; curve B a liquid crystal having an index of refraction anisotropy of 0.17; and curve C a liquid crystal having an index of refraction anisotropy of 0.21 and represents a liquid crystal mixture of the present invention. It can be seen that the smaller the index of refraction anisotropy, the steeper the slope of the curve.

The invention will be further illustrated by the following examples, but it is to be understood that the invention is not meant to be limited to the details described therein.

In the Examples parts and percentages are by weight.

EXAMPLE 1

A mixture of 1.34 parts of p-cyanophenyl-p'-n-butylbenzoate, 3.09 parts of p-cyanophenyl-p'-n-heptylbenzoate, 1.66 parts of p-cyano-p'-n-pentylbiphenyl, 1.29 parts of p-cyano-p'-n-heptylbiphenyl and 1.0 part of p-cyano-p''-n-pentylterphenyl was prepared. This liquid crystal composition had a nematic temperature range of −10° to 65° C. The index of refraction anisotropy was 0.208.

Figure 2:
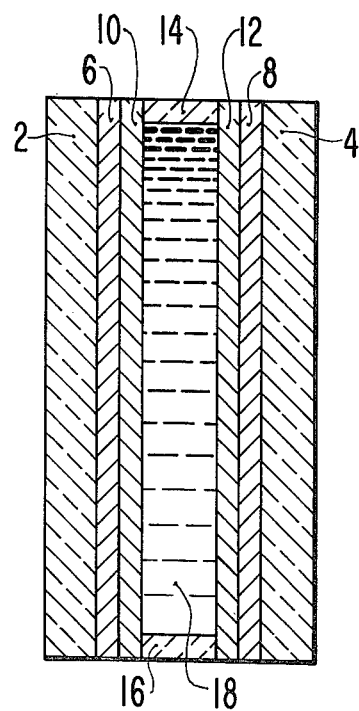
FIG. 2 is a cross-sectional view of a typical twisted nematic liquid crystal cell.

The composition was inserted into a liquid crystal cell as in FIG. 2. Referring to FIG. 2, a liquid crystal cell is constructed from two glass plates 2 and 4 having conductive tin-doped indium oxide coatings as electrodes 6 and 8, respectively, on facing surfaces thereof. Then silicon oxide layers 10 and 12 are evaporated onto the conductive coatings 6 and 8 respectively, at an angle of about 60°. These layers act to align the liquid crystal material in a direction parallel to the plates 2 and 4. One half mil (12.7 microns) thick glass frit spacers 14 and 16 maintain the coated glass plates 2 and 4 apart to complete the cell components. The cell is baked at about 500° C. to melt the glass frit and seal the cell except for a single fill port. The cell is filled with the liquid crystal composition 18 in the isotropic state and the fill port is hermetically sealed with solder.

A voltage of about three times the threshold voltage was applied to the cell. The "turn-on" time was 238 msec. and "turn-off" time was 128 msec.

EXAMPLE 2

A liquid crystal mixture containing 52.9% of a commercially available liquid crystal ester obtainable as ROTN 101 from Hoffman-LaRoche containing p-cyanophenyl-p'-n-butylbenzoate, p-cyanophenyl-p'-n-hexylbenzoate, p-cyanophenyl-p'-n-octylbenzoate and p-(p'-n-butylbenzoyloxy) phenyl-p''-n-butyl-o''-methylbenzoate, 19.9% of p-cyano-p'-n-pentylbiphenyl, 15.3% of p-cyano-p'-n-heptylbiphenyl and 11.9% of p-cyano-p''-n-pentylterphenyl was prepared. This liquid crystal composition had a nematic temperature range of −50° to 77° C. The index of refraction anisotropy was 0.206.

COMPARATIVE EXAMPLES

Mixtures of other liquid crystals were made and their properties compared to those of the present invention.

Mixture A is a mixture of 1 part of p-cyanophenyl-p'-n-butylbenzoate and two parts of p-cyanophenyl-p'-n-heptylbenzoate. This mixture has an index of refraction anisotropy of 0.17 but it has a very low nematic temperature range of only +25° to 50° C., and response times were high; "turn-on" time was 225 msec. and "turn-off" time was about 213 msec.

Mixture B is a mixture of biphenyl and terphenyl liquid crystals commercially available as E-7 from the British Drug House. The mixture contains p-cyano-p'-n-pentylbiphenyl, p-cyano-p'-n-heptylbiphenyl, p-cyano-p'-n-octyloxybiphenyl and p-cyano-p'-n-pentylterphenyl and has a nematic temperature range of −10° to 59° C. The response times are low, "turn-on" time was 114 msec. and "turn-off" time was 85 msec., but the index of refraction anisotropy is high, 0.23.

What is claimed is:

1. An electro-optic device having an improved viewing angle comprising a nematic liquid crystal composition between two electrodes, wherein the liquid crystal composition has an index of refraction anisotropy of less than 0.23 and contains a mixture of at least one compound from each of the following groups of liquid crystal compounds (1) a liquid crystal ester having the formula

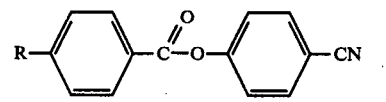

wherein R is an alkyl group of 4 to 10 carbon atoms; (2) a liquid crystal diester having the formula

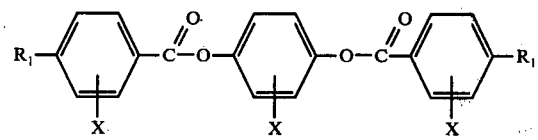

wherein $R_1$ at each occurrence is an alkyl group of 1 to 10 carbon atoms, and X at each occurrence is hydrogen or a methyl group with the proviso that at least one X is methyl; (3) a liquid crystal biphenyl having the formula

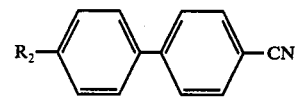

wherein $R_2$ is an alkyl or alkoxy group of 3 to 8 carbon atoms; and (4) a liquid crystal terphenyl compound having the formula

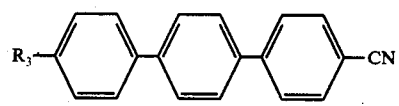

wherein $R_3$ is an alkyl or alkoxy group of 4 to 6 carbon atoms.

2. A liquid crystal composition having an index of refraction anisotropy from about 0.17 to about 0.23 which comprises a mixture of at least one compound from each of the following groups of liquid crystal compounds: (1) a liquid crystal ester having the formula

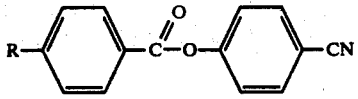

wherein R is an alkyl group of 4 to 10 carbon atoms; (2) a liquid crystal diester having the formula

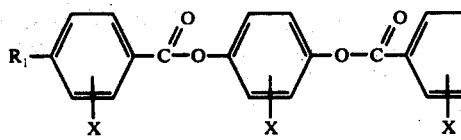

wherein $R_1$ at each occurrence is an alkyl group of 1 to 10 carbon atoms, and X at each occurrence is hydrogen or a methyl group with the proviso that at least one X is methyl; (3) a liquid crystal biphenyl compound having the formula

wherein $R_2$ is an alkyl or alkoxy group of 3 to 8 carbon atoms; and (4) a liquid crystal terphenyl compound having the formula

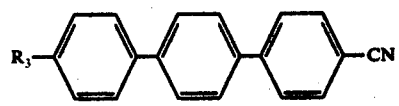

wherein $R_3$ is an alkyl or alkoxy group of 4 to 6 carbon atoms.